US006661460B1

(12) United States Patent
Higuchi (10) Patent No.: US 6,661,460 B1
(45) Date of Patent: Dec. 9, 2003

(54) ELECTRONIC CAMERA WITH A VIEW FINDER OPTICAL PATH SWITCHING DEVICE FOR SELECTIVE TRANSMISSION AND REFLECTION OF LIGHT BEAM

(75) Inventor: Tatsuji Higuchi, Akiruno (JP)

(73) Assignee: Olympus Optical Co., Ltd. (JP)

( * ) Notice: Subject to any disclaimer, the term of this patent is extended or adjusted under 35 U.S.C. 154(b) by 0 days.

(21) Appl. No.: 09/350,236

(22) Filed: Jul. 9, 1999

(30) Foreign Application Priority Data

Jul. 14, 1998 (JP) ........................................ H10-199253

(51) Int. Cl.$^7$ .............................................. H04N 5/222
(52) U.S. Cl. .................... 348/333.08; 348/344; 348/371
(58) Field of Search ............................ 348/207.99, 355, 348/340, 341, 342, 343, 344, 370, 371, 375, 333.01, 333.08, 333.11; 396/257, 373, 378, 125

(56) References Cited

U.S. PATENT DOCUMENTS

| 4,757,387 A | * | 7/1988 | Saito ........................... 348/342 |
| 5,459,511 A | * | 10/1995 | Uehara et al. ............... 348/335 |
| 5,587,766 A | * | 12/1996 | Kawamura et al. .......... 396/257 |
| 6,069,659 A | * | 5/2000 | Nakajima .................... 348/371 |
| 6,441,856 B1 | * | 8/2002 | Sugimoto .................... 348/371 |

FOREIGN PATENT DOCUMENTS

JP        9-166817        6/1997

* cited by examiner

Primary Examiner—Tuan Ho
(74) Attorney, Agent, or Firm—Ostrolenk, Faber, Gerb & Soffen, LLP (57) ABSTRACT

An electronic camera including a built-in strobe, an external strobe synchronization terminal, a photographic optical system, a prism, an imaging device, a viewfinder optical system, a light adjustment device, a movable mirror, and a drive source and drive circuit. External strobes are connected to the external strobe synchronization terminal so that they can be flashed synchronously with the built-in strobe. The prism splits a beam having passed through the photographic optical system. One portion of the split beam is converged on the imaging device to form an image thereon. The other portion of the split beam enters the viewfinder optical system. The light adjustment device detects the luminance of an object illuminated by the strobes. The movable mirror can selectively assume a position for transmitting a beam and a position for reflecting a beam. In the position for transmitting a beam, the movable mirror lies within the viewfinder optical system and routes a beam towards an eyepiece. In the position for reflecting a beam, the movable mirror reflects the beam towards the light adjustment device. The drive source and drive circuit displace the movable mirror. An amount of strobe light can be detected accurately by measuring the beam having passed through the photographic optical system. An image observed through the viewfinder does not appear dark.

16 Claims, 4 Drawing Sheets

ELECTRONIC CAMERA WITH A VIEW FINDER OPTICAL PATH SWITCHING DEVICE FOR SELECTIVE TRANSMISSION AND REFLECTION OF LIGHT BEAM

BACKGROUND OF THE INVENTION

1. Field of the Invention

The present invention relates to an electronic camera, or more particularly, an electronic camera capable of illuminating an object with a strobe.

2. Description of the Related Art

Generally, for a silver-film camera and electronic camera, when the luminance of an object is insufficient or any intention works on photography, a strobe or the like is usually used to irradiate illumination light for photography. At this time, an amount of flash emitted from the strobe is controlled by various means. According to a conventionally adopted means, an amount of flash is detected using, for example, a light adjustment device. When the amount of flash has reached a predetermined value, flashing is stopped.

The location of the light adjustment device in a camera varies depending on a design or appearance. For example, the light adjustment device sometimes is included as an optical system independent of a photographic optical system outside the photographic optical system. However, when a camera having the light adjustment device as the independent optical system is put to use, a range of exposure and a range of photometry may be mismatched in some photographic situations, or especially, during close photography. Consequently, an exposure error is likely to occur. This is a well-known phenomenon.

Single-lens reflex camera users request accurate exposure. For preventing the mismatch between the range of exposure and range of photometry, it is preferred to measure a beam having passed through a photographic optical system so as to control an amount of flash for stroboscopic photography.

In a conventional silver-film type single-lens reflex camera, a strobe light adjustment device is located on the bottom of a mirror box. Reflected light from the film passing through a photographic optical system is detected, and an amount of flash emitted from a strobe is controlled correspondingly. This technology is well known.

For the electronic camera, a CCD is used as an imaging device. A light receiving window of the CCD is made from a transparent glass. It is therefore impossible to utilize light reflected from an imaging surface of a silver film. In the electronic camera, therefore, a beam passing through a photographic optical system is used to detect an amount of strobe light in efforts to remove influence of a parallax. Moreover, a light adjustment device is realized with the imaging device. For stroboscopic photography, a strobe is flashed preliminarily. An amount of preliminary flash is detected by the imaging device. An amount of strobe light required for actual flashing is determined based on the results of detection. Photography is then carried out. This so-called preliminary flashing method is widely adopted.

However, the preliminary flashing method proves effective only when a built-in strobe of an electronic camera is used. When a multi-strobe mode is adopted, since an external strobe must be flashed synchronously with the built-in strobe, the electronic camera cannot accommodate the use of the external strobe. According to the preliminary flashing method, the strobe cannot be accurately controlled to flash a certain small amount of light. An exposure error is therefore likely to occur during close photography.

According to another technology that does not utilize reflection from a film, a photographic optical system and a viewfinder optical system share components, and a light adjustment device is included in the viewfinder optical system. For example, Japanese Unexamined Patent Publication No. 9-166817 has disclosed a single-lens reflex camera. In the single-lens reflex camera, a pop-up full reflection mirror is located on an optical path in the photographic optical system, and light reflected from the full reflection mirror is routed to the viewfinder optical system. The signal-lens reflex camera includes a diffusion plate located in an optical path in the viewfinder optical system, and a light adjustment device for detecting light diffused by the diffusion plate. For photography, preliminary flashing is performed with the full reflection mirror located in the optical path in the photographic optical system. An amount of strobe light is detected by the light adjustment device. An amount of strobe light required for actual flashing is determined based on the results of detection. The full reflection mirror is withdrawn from the optical path in the photographic optical system. Actual flashing is then performed for photography.

For the camera described in the Japanese Unexamined Patent Publication No. 9-166817, a conceivable means for controlling an amount of strobe light will be described below. Specifically, the pop-up full reflection mirror included in a single-lens reflex optical system is replaced with a translucent reflection mirror. An amount of flashlight emitted during photography is detected in real time in order to control an amount of strobe light. However, a beam passing through the photographic optical system must be split into light incident on the imaging device and light incident on the viewfinder optical system. The light incident on the viewfinder optical system must be split into light incident on an eyepiece and light incident on the light adjustment device. This results in an insufficient amount of light. In particular, an amount of light routed to the viewfinder optical system is smaller than that routed to the imaging device. When the small amount of light is distributed to the light adjustment device, a viewfinder image observed through the eyepiece appears dark.

SUMMARY OF THE INVENTION

An object of the present invention is to provide an electronic camera capable of accurately detecting an amount of strobe light according to a beam passing through a photographic optical system, and of preventing a view observed through a viewfinder from appearing dark.

Briefly, according to the present invention, there is provided an electronic camera including a strobe, a single-lens reflex optical system, a light adjustment device and an optical path switching means. The strobe is used to illuminate an object. The single-lens reflex optical system consists of a photographic optical system and a viewfinder optical system. The photographic optical system converges an incident beam reflecting from the object on an imaging device to form an image thereon. The viewfinder optical system routes at least part of the beam having passed through the photographic optical system to an eyepiece so that the object can be observed through the eyepiece. The light adjustment device detects an amount of light emitted from the strobe and reflected from the object. The optical path switching means is included in the viewfinder optical system, and routes a beam reflected from the object selectively to the eyepiece and light adjustment device.

The object and advantages of the present invention will be further apparent from the following detailed explanation.

DESCRIPTION OF THE PREFERRED EMBODIMENTS

Referring to the drawings, the embodiments of the present invention will be described below.

Figure 1:
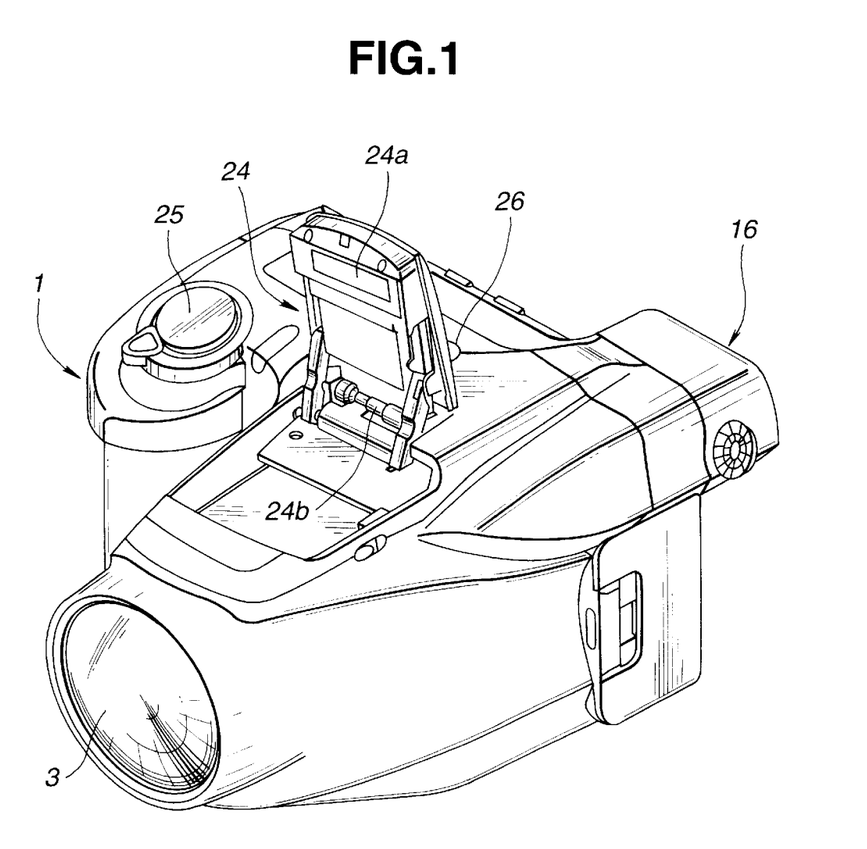
FIG. 1 is an oblique view of an electronic camera constructed in accordance with the first embodiment of the present invention.
Figure 2:
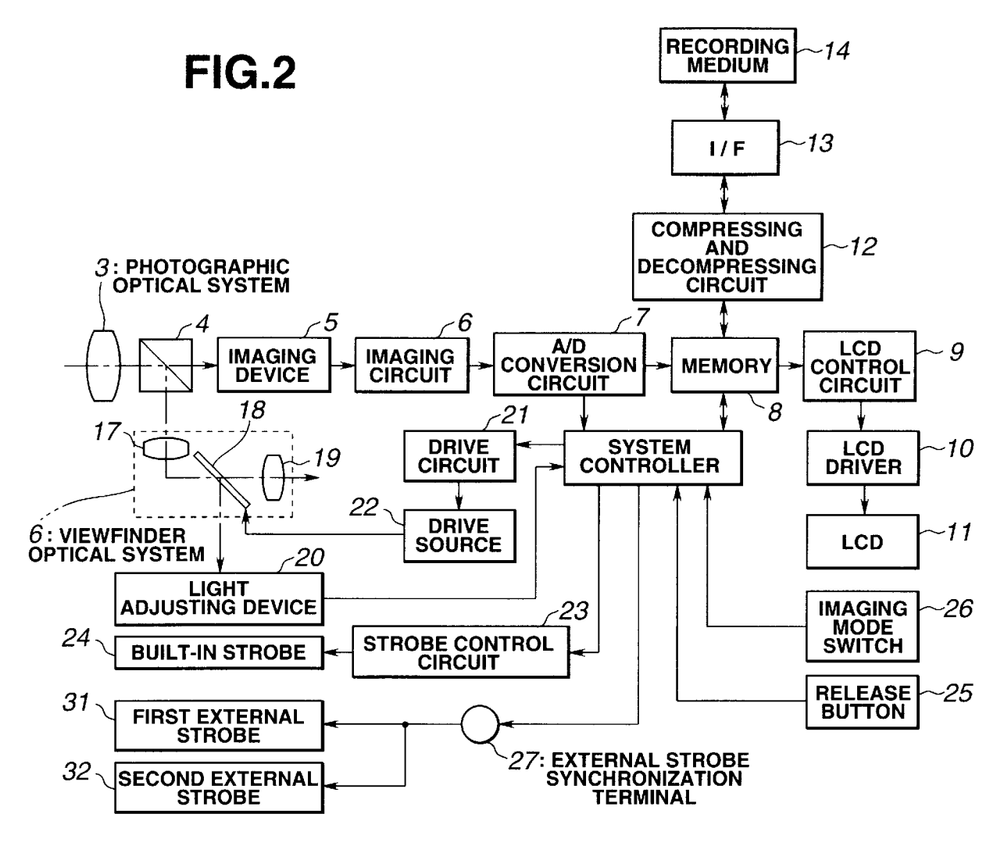
FIG. 2 is a block diagram of an electric circuit configuration of the electronic camera in accordance with the first embodiment.
Figure 3:
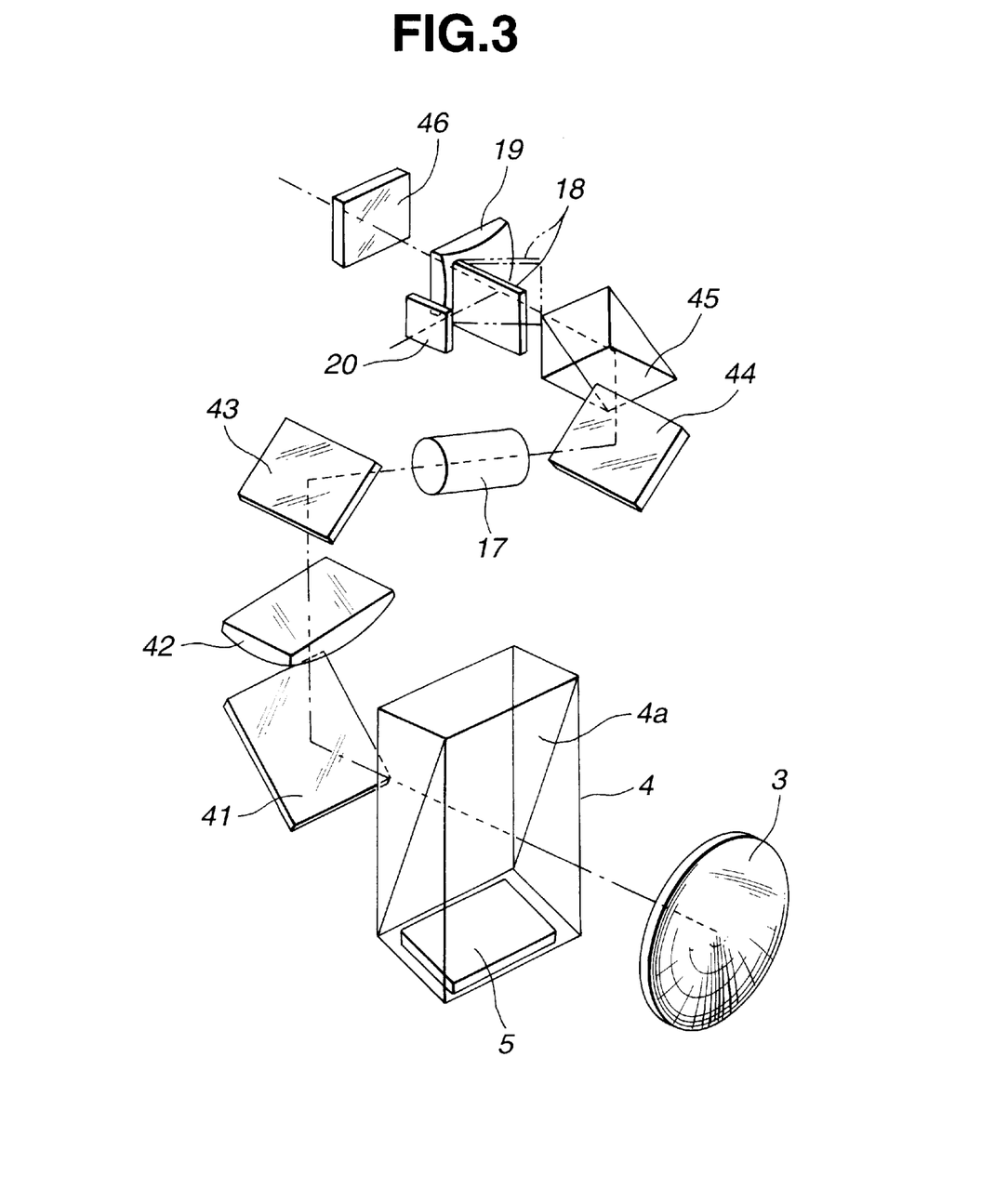
FIG. 3 is an oblique view of a single-lens reflex optical system of the electronic camera constructed in accordance with the first embodiment.

FIG. 1 to FIG. 3 show the first embodiment of the present invention. FIG. 1 is an oblique view of an electronic camera. FIG. 2 is a block diagram of an electric circuit configuration of the electronic camera. FIG. 3 is an oblique view of a single-lens reflex optical system of the electronic camera.

The electronic camera 1 includes a photographic optical system 3, a release button 25, a photography mode switch 26, a viewfinder optical system 16, and a built-in strobe 24. The photographic optical system 3 forms part of a single-lens reflex optical system for forming an image represented by an incident beam reflected from an object. The release button 25 is used to enter an instruction controlling photography. The photography mode switch 26 is used to change photography modes. The viewfinder optical system 16 forms part of the single-lens reflex optical system for enabling observation of an object image coming from the photographic optical system 3. The built-in strobe 24 illuminates the object. The built-in strobe 24 can swing about a support axis 24b, and can be displaced into a position in which a flashing portion 24a is erected and a position in which the flashing portion is stowed in a housing.

The detailed configuration of the electronic camera 1 is shown in FIG. 2.

The electronic camera 1 includes the components described below. Specifically, the photographic optical system 3 converges an incident beam reflected from an object on an imaging device 5 to form an image. A prism 4 transmits part of the beam, which has passed through the photographic optical system and split, and reflects a part thereof. The imaging device 5 photoelectrically converts an optical image projected by the beam reflected from the object and split by the prism 4, and outputs an electronic signal. An imaging circuit 6 performs various kinds of electrical processing on the output of the imaging device 5. An A/D conversion circuit 7 converts an output of the imaging circuit 6 into a digital signal. A memory 8 is used to temporarily store an object image digitized by the A/D conversion circuit 7. An LCD control circuit 9 produces an image signal, containing data for an image to be displayed on an LCD, according to an output of the memory 8. An LCD driver 10 receives an output of the LCD control circuit and drives an LCD 11, described later. The LCD 11 is an image display means that displays an object image and other information when driven by the LCD driver 10. A compressing and decompressing circuit 12 compresses an output of the memory 8 or decompresses compressed image data read from a recording medium 14, described later, according to an instruction input by pressing the release button 25. An interface (I/F) 13 is used to record an output of the compressing and decompressing circuit 12 in the recording medium 14. The recording medium 14 is used to store compressed image data or the like that is output through the interface 13, and realized with a detachable memory card or the like. A relay lens 17 is included in the viewfinder optical system 16 for transmitting another portion of the object beam split by the prism 4. A movable mirror 18, a reflection member, serves as an optical path switching means. The movable mirror 18 is included in the viewfinder optical system 16 so that the movable mirror 18 can selectively assume a position for transmitting a beam and a position for reflecting a beam. In the position for transmitting a beam, the movable mirror 18 withdraws from the optical path of the beam to route the beam to an eyepiece 19, described later. In the position for reflecting a beam, the movable mirror 18 is located on the optical path along which the beam travels and reflects at least part of the beam towards a light adjustment device 20, described later. When the movable mirror 18 is placed in the position for transmitting a beam, the eyepiece 19 magnifies an object image and routes it to observer's eyes. When the movable mirror 18 is placed in the position for reflecting a beam, the light adjustment device 20 lies at a position to which the beam reaches, and measures the illuminance of an object illuminated by the strobe. A drive source 22, an integral part of an optical path switching means, displaces the movable mirror 18 into the position for transmitting a beam or the position for reflecting a beam. A drive circuit 21, another integral part of the optical path switching means, controls the drive source 22. The built-in strobe 24 illuminates an object. A strobe control circuit 23 a strobe control means, controls an amount of flash emitted from the built-in strobe 24 and a flashing time. The release button 25 is used to enter an instruction for controlling recording of data in the recording medium 14. The photography mode switch 26 is used to change photography modes to which the electronic camera 1 is set. An external strobe is connected through an external strobe synchronization terminal 27, whereby the external strobe is flashed synchronously with the built-in strobe 24. A system controller 15, a control means and strobe control means, controls the electronic camera including the above components on a centralized basis.

One or more external strobes can be connected through the strobe synchronization terminal 27. In the example shown in FIG. 2, a first external strobe 31 and second external strobe 32 are connected through the strobe synchronization terminal 27.

Referring to FIG. 3, the single-lens reflex optical system will be described below.

Part of an incident beam coming from the photographic optical system 3 is reflected from a translucent reflecting surface 4a of the prism 4 formed by bonding, for example, two triangular prisms. The reflected beam is incident on the imaging device 5 fixed to one surface of the prism 4.

The beam, having passed through the translucent reflecting surface 4a, is reflected by the mirror 41, and then converged on a condenser 42 that is realized with a primary image forming surface. The beam formed an image on the condenser 42 is reflected by the mirror 43 and transmitted to the relay lens 17. Thereafter, the beam is reflected by the mirror 44 and prism 45. The beam then reaches a space in which the movable mirror 18 is located.

The movable mirror 18 can be, as mentioned above, placed selectively in the position for transmitting a beam and the position for reflecting a beam. In the position for transmitting a beam, the movable mirror 18 withdraws from the optical path of the beam and permits the beam to pass through the eyepiece 19. In the position for reflecting a beam, the movable mirror 18 lies in the optical path along which the beam travels and reflects at least part of the beam towards the light adjustment device 20.

When the movable mirror 18 is placed in the position for transmitting a beam, the beam is magnified by the eyepiece 19 and then passed through the transparent window 46. The image projected by the beam is then observed by a photographer.

When the movable mirror 18 is placed in the position for reflecting a beam, the beam is reflected from the movable mirror 18 and then reaches the light adjustment device 20. The light adjustment device 20 detects the luminance of an object illuminated with strobe light.

A plurality of control modest including a light adjustment mode,and a preliminary flashing mode is available for controlling the strobe light with the strobe control circuit 23. Specifically, in the light adjustment mode, the strobe is controlled in real time according to the results of detection performed by the light adjustment device 20. In the preliminary flashing mode, the built-in strobe 24 is flashed preliminarily prior to photography. An amount of light reflected from an object at that time is detected by the imaging device 5 or light adjustment device 20. An amount of flash to be actually emitted from the built-in strobe 24 for photography is determined based on the results of detection. The strobe is thus controlled. Any of the control modes can be selected.

When the light adjustment device 20 is used for photometry, the movable mirror 18 is placed in the position for reflecting a beam. An object cannot therefore be observed through the eyepiece 19. When the light adjustment mode is designated, or when the preliminary flashing mode is designated and photometry is performed using the light adjustment device 20, an electronic viewfinder mode should preferably be set automatically. In the electronic viewfinder mode, an object is observed using the LCD 11.

Photography modes selectable using the photography mode switch 26 include a macrograph mode and a multi-strobe mode. In the macrograph mode, an object lying at a shorter range than a predetermined range is photographed. In the multi-strobe mode, the built-in strobe 24 and a plurality of strobes, the external strobes 31 and 32, are flashed while being interlocked with an action for photography in order to illuminate an object.

When the macrograph mode or multi-strobe mode is selected as a photography mode, the strobe control circuit 23 autonomously selects the light adjustment mode to control the strobe.

Next, actions to be made for performing stroboscopic photography using the electronic camera 1 will be described.

Assuming that the electronic camera 1 is set to the light adjustment mode and the built-in strobe 24 and external strobes 31 and 32 are flashed for photography when the release button 25 is pressed, the system controller 15 drives the drive source 22 using the drive circuit 21. The movable mirror 18 is placed into the position for reflecting a beam by a moving member including gears to be meshed with the drive source 22. Consequently, object light is routed to the light adjustment device 20.

In this state, light entering through the transparent window 26 and eyepiece 19 is intercepted by the movable mirror 18 and does not therefore reach the imaging device 5 and light adjustment device 20.

The light adjustment sensor 20 integrates an amount onto light irradiated to the object. When a magnitude of exposure has been set to a proper value, a signal indicating such is output to the strobe control circuit 23 via the system controller 15.

In response to the signal indicating the detection of the proper value for the magnitude of exposure, the strobe control circuit 23 causes the built-in strobe 24 to stop flashing. When the external strobes 31 and 32 are flashing, the system controller 15 outputs a flashing stop signal through the external strobe synchronization terminal 27. Consequently, the external strobes 31 and 32 stop flashing synchronously with the built-in strobe 24.

Thereafter, when photography is completed, the system controller 15 causes the drive circuit 21 to drive the drive source 22. The movable mirror 18 is then restored to the position for transmitting a beam by the moving member including gears meshed with the drive source 22.

When the light adjustment mode is designated, the luminance of the object is measured in real time. When the luminance reaches a predetermined level, flashing is stopped. Thus, proper luminance can be maintained.

Only when the movable mirror 18 must be used for measurement is the beam routed through the viewfinder optical system 16 distributed to the light adjustment device 20. Otherwise, the beam passes through the eyepiece 19. When observing an object, the view will not appear dark. When the light adjustment device 20 is used for measurement, it will not receive an amount of light that is insufficient. The light adjustment device 20 can therefore adjust light accurately.

When the electronic camera 1 is set to the preliminary flashing mode, the built-in strobe 24 is flashed preliminarily. Even for actual flashing, the built-in strobe 24 alone is flashed for photography.

When the release button 25 is pressed, the built-in strobe 24 is flashed preliminarily. An image of an illuminated object is formed on the imaging device by means of the photographic optical system 3. An amount of light that is proper for actual flashing is calculated based on an output of the imaging device 5.

Based on the results of calculation, the built-in strobe 24 is flashed actually. The imaging device 5 photoelectrically converts optical data. The resultant data is recorded in the recording medium 14.

For calculating an amount of light required for actual flashing, data acquired by the imaging device 5 during preliminary flashing may be used as mentioned above. Alternatively, the light adjustment device 20 may be used for measurement so that measured data can be acquired during preliminary flashing.

According to the first embodiment, of the invention the light adjustment device detects an amount of strobe light by measuring a beam passed through the photographic optical system. Therefore a range in which an amount of strobe light is detected and a range to be exposed during photography will not be mismatched. Light can therefore be detected and adjusted accurately without occurrence of a parallax.

An amount of strobe light emitted for photography is detected in real time. In the macrograph mode or multi-strobe mode, if the preliminary flashing mode is designated, a magnitude of exposure cannot be calculated accurately. According to the first of the invention if the macrograph mode or multi-strobe mode is designated, the light adjustment mode is automatically selected. The magnitude of exposure can therefore be calculated accurately without any manual setting or the like or with simple manipulations.

The light adjustment device is included in the viewfinder optical system. A beam passing through the view finder optical system is delivered selectively to the eyepiece and light adjustment device. When an object image is observed through the eyepiece, the object image will not appear dark. Moreover, when the luminance of an object illuminated with strobe light is measured during photography, an amount of light will be sufficient.

Furthermore, the invention blocks light from the eyepiece unit of the viewfinder optical system during photography. Consequently, a bright object image can be projected without entrance of unnecessary light.

When an object cannot be observed through the optical viewfinder, the mode in which the LCD is used as a viewfinder is set automatically. The object can be observed through the viewfinder without any annoying manipulations.

Figure 4:
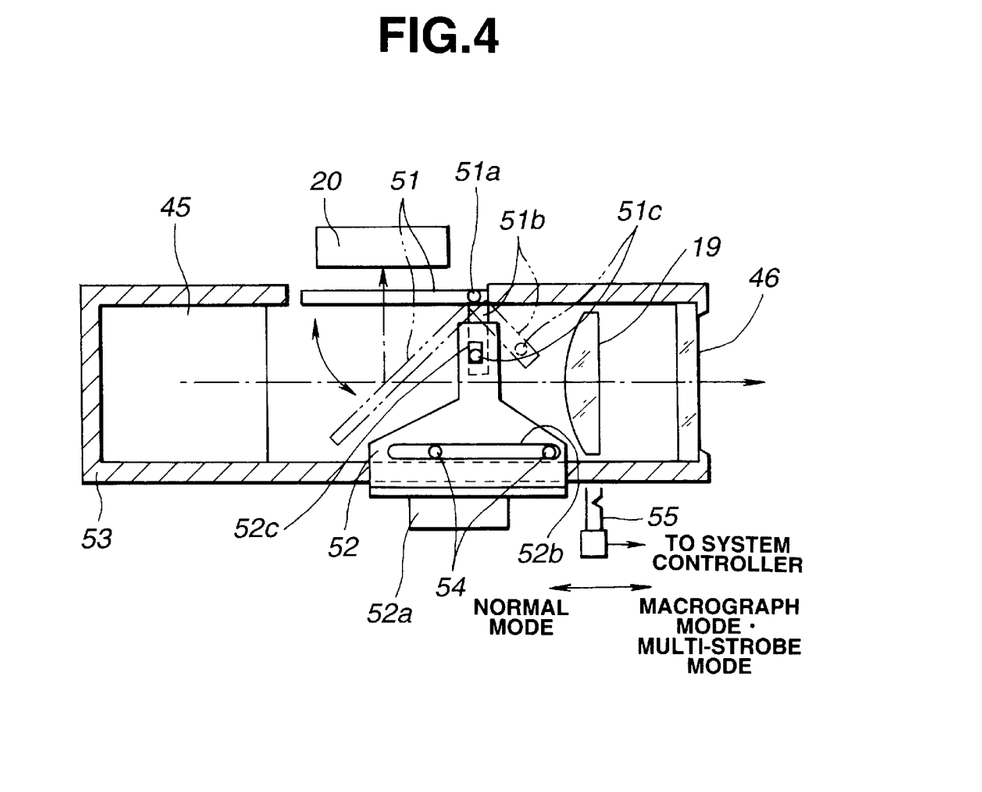
FIG. 4 is a cross-sectional view of a viewfinder optical system constructed in accordance with the second embodiment of the present invention.

FIG. 4 is a cross-sectional view a viewfinder optical system constructed according with the second embodiment of the present invention. The description of the components corresponding to the first embodiment will be omitted.

In the second embodiment, a movable mirror for switching the destination of a beam from an eyepiece to a light adjustment device or vice versa can be moved manually.

The prism 45, a movable mirror 51, a reflecting member and an integral part of an optical path switching means, the eyepiece 19, and the transparent window 46 are mounted in a viewfinder case 53. The viewfinder case 53 holds a viewfinder optical system.

The movable mirror 51 is designed to be able to swing about an axis of rotation 51a. The light adjustment device 20 is located at a position in an optical path along which a reflected beam travels when the movable mirror 51 encroaches into the optical path to assume the position for reflecting a beam.

The movable mirror 51 has an arm portion that extends beyond the axis of rotation 51a. A locking boss 51c extends from the arm portion 51b.

The boss 51c is received into a fitting hole 52c in a switching lever 52 a moving member and an integral part of the optical path switching means. Driving force is thus conveyed from the switching lever 52 to the movable mirror 51.

A sliding pin 54 slides in an oblong hole 52b of the switching lever 52. The switching lever 52 can be moved along, for example, the optical axis of the eyepiece 19. A manipulated portion 52a to be manipulated with a finger or the like in order to move the switching lever along the optical axis is formed as an integral part of the switching lever 52.

When a photographer slides the manipulated portion 52a, the movable mirror 51 can be switched from the position for reflecting a beam to the position for transmitting a beam or vice versa.

In the example shown in FIG. 4, the manipulated portion 52a is manipulated for sliding the switching lever 52 to the left in FIG. 4. A normal mode in which an object can be observed is thus designated. When the switching lever is slid to the right in FIG. 4, the light adjustment mode associated with the macrograph mode or multi-strobe mode is designated.

The movement of the switching lever 52 is detected by a switch 55 serving as a detecting means, for example, a leaf switch located on the route of the movement of the switching lever 52. The results of detection are input to the system controller 15.

When the switch 55 is off, the system controller 15 selects the normal mode. When the switch 55 is on, the system controller 15 selects the light adjustment mode.

When the strobe is flashed, the system controller 15 outputs a command to the strobe control circuit 23 according to a designated mode. Otherwise, the system controller 15 outputs a control signal through the external strobe synchronization terminal 27 so as to control flashing of the built-in strobe 24 and the first and second external strobes 31 and 32.

The second embodiment of the invention provides advantages substantially identical to those of the first embodiment of the invention. In addition, since the movable mirror is moved manually, the drive source and drive circuit for driving the movable mirror become unnecessary. This decreases cost and promotes compact camera design.

When photography is performed using a self-timer, if a photographer designates the light adjustment mode, photography can be achieved without light entering from the transparent window 26 or eyepiece 19, such light being prevented by the movable mirror.

The position of the switching lever 52 is detected with the switch 55. The light adjustment mode is automatically selected based on the results of detection. No extra manipulation is therefore needed. This results in improved manipulation efficiency.

The set positions of the movable mirror may be switched using both the foregoing manual means and the drive source described with respect to the first embodiment. The switching means may be, if necessary, able to be changed from the manual means to the drive source or vice versa.

The present invention is not limited to the aforesaid embodiments. Various variants and applications can be made within the scope of the invention without a departure from the gist of the invention.

In this invention, it is apparent that a wide range of different working modes can be formed on the basis of this invention without a departure from the spirit and scope of the invention. This invention will not be restricted by any specific embodiment but limited by the appended claims.

What is claimed is:

1. An electronic camera, comprising:

a strobe for illuminating an object;

a single-lens reflex optical system including a photographic optical system for converging an incident beam reflected from said object on an imaging device to form an image thereon, and a viewfinder optical system for routing at least part of the beam having passed through said photographic optical system to an eyepiece and enabling observation of said object through said eyepiece;

a light adjustment device for detecting an amount of light reflected from said object illuminated by said strobe; and an optical path switching means included in said viewfinder optical system and capable of selectively assuming a state in which said optical path switching means routes the beam reflected from said object to said eyepiece and a different positioning state in which said optical path switching means routes at least a portion of the beam to said light adjustment device.

2. An electronic camera according to claim 1, wherein said optical path switching means includes a reflecting member capable of selectively assuming a state for transmitting a beam in which said reflecting member withdraws from an optical path, along which the beam travels, to allow the beam to enter said eyepiece, and a state for reflecting a beam in which said reflecting member lies in the optical path, along which the beam travels, to reflect at least part of the beam towards said light adjustment device; and a moving member for displacing said reflecting member into the state for reflecting a beam or the state for transmitting a beam.

3. An electronic camera according to claim 2, wherein said optical path switching means further includes a drive source for driving said moving member.

4. An electronic camera according to claim 2, wherein said moving member can be moved manually.

5. An electronic camera according to claim 1, further comprising a strobe control means for controlling flashing of said strobe, wherein said strobe control means can operate in a plurality of control modes including a light adjustment mode, in which said strobe is controlled based on the results of detection performed by said light adjustment device, and a preliminary flashing mode in which: said strobe is flashed preliminarily prior to photography; an amount of light reflected from said object at that time is detected by said imaging device or light adjustment device; an amount of flashlight to be actually emitted from said strobe for photography is determined based on the results of detection; and thus said strobe is controlled, and wherein any of the control modes can be selected.

6. An electronic camera according to claim 5, wherein a plurality of photography modes that can be designated includes a multi-strobe mode in which a plurality of strobes including said strobe and one or more external strobes located outside said electronic camera, is flashed while being interlocked with an action for photography in order to illuminate an object, and a macrograph mode in which an object lying at a shorter range than a predetermined range is photographed, and wherein when said macrograph mode or multi-strobe mode is designated as a photography mode, said strobe control means autonomously selects the light adjustment mode to control said strobe.

7. An electronic camera according to claim 5, wherein said optical path switching means includes a reflecting member and a moving member that displaces the reflecting member so as to selectively reflect or transmit a beam and wherein said moving member can be moved manually, a detecting means is included for detecting the position of said moving member, said strobe controller including the light adjustment mode and preliminary flashing mode according to the results of detection performed by said detecting means.

8. An electronic camera according to claim 1, further comprising an image display means for displaying an object image according to an output signal of said imaging device, and a control means for, when a mode is designated in which said optical path switching means assumes the state in which it routes a beam reflected from an object towards said light adjustment device, allowing said image display means to display an object image prior to photography and to thus function as a viewfinder.

9. An electronic camera, comprising:

a strobe for illuminating an object;

a single-lens reflex optical system including a photographic optical system for converging an incident beam reflected from said object on an imaging device to form an image thereon, and a viewfinder optical system for routing at least part of the beam having passed through said photographic optical system to an eyepiece and enabling observation of said object through said eyepiece;

a light adjustment device for detecting an amount of light reflected from said object illuminated by said strobe; and an optical path switching device included in said viewfinder optical system and capable of selectively assuming a first state in which said optical path switching device routes the beam reflected from said object to said eyepiece and a different state in which said optical path switching device routes at least a portion of the beam to said light adjustment device.

10. An electronic camera according to claim 9, wherein said optical path switching device includes a reflecting member capable of selectively assuming a state for transmitting a beam in which said reflecting member withdraws from an optical path, along which the beam travels, to allow the beam to enter said eyepiece, and a state for reflecting a beam in which said reflecting member lies in the optical path, along which the beam travels, to reflect at least part of the beam towards said light adjustment device; and a moving member for displacing said reflecting member into the state for reflecting a beam or the state for transmitting a beam.

11. An electronic camera according to claim 10, wherein said optical path switching device further includes a drive source for driving said moving member.

12. An electronic camera according to claim 10, wherein said moving member can be moved manually.

13. An electronic camera according to claim 9, further comprising a strobe controller for controlling flashing of said strobe, wherein said strobe controller is operable in a plurality of control modes including a light adjustment mode, in which said strobe is controlled based on the results of detection performed by said light adjustment device, and a preliminary flashing mode in which: said strobe is flashed preliminarily prior to photography; and an amount of light reflected from said object at that time is detected by said imaging device or light adjustment device; an amount of flashlight to be actually emitted from said strobe for photography is determined based on the results of detection; and thus said strobe is controlled, and wherein any of the control modes can be selected.

14. An electronic camera according to claim 13, wherein a plurality of photography modes that can be designated includes a multi-strobe mode in which a plurality of strobes out of said strobe and one or more external strobes located outside said electronic camera is flashed while being interlocked with an action for photography in order to illuminate an object, and a macrograph mode in which an object lying at a shorter range than a predetermined range is photographed, and wherein when said macrograph mode or multi-strobe mode is designated as a photography mode, said strobe controller autonomously selects the light adjustment mode to control said strobe.

15. An electronic camera according to claim 13, wherein said optical path switching device includes a reflecting member and a moving member that displaces the reflecting member so as to selectively reflect or transmit a beam and wherein said moving member can be moved manually, a position detector is included for detecting the position of said moving member, and said strobe control means switches the plurality of control modes including the light adjustment mode and preliminary flashing mode according to the results of detection performed by said position detector.

16. An electronic camera according to claim 9, further comprising an image display for displaying an object image according to an output signal of said imaging device, and a controller for, when a mode is designated in which said optical path switching device assumes the state in which it routes a beam reflected from an object towards said light adjustment device, allowing said image display to display an object image prior to photography and to thus function as a view finder.

* * * * *